(12) United States Patent
Scott et al.

(10) Patent No.: US 11,734,507 B1
(45) Date of Patent: Aug. 22, 2023

(54) ACRONYM IDENTIFICATION AND DEFINITION IN MESSAGES

(71) Applicant: Microsoft Technology Licensing, LLC, Redmond, WA (US)

(72) Inventors: Danielle Amanda Scott, Bellevue, WA (US); Daniel Antonio Varela Serrano, Cartago (CR); Khushboo Gupta, Uttar Pradesh (IN); Sonal Verma, Haryana (IN); Maiara Lange, Rio Grande do Sul (BR); Somya Upadhyay, Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/824,369

(22) Filed: May 25, 2022

(51) Int. Cl.
  *G06F 40/242* (2020.01)
  *G06F 40/205* (2020.01)
  *G06F 40/166* (2020.01)
  *H04L 51/046* (2022.01)
  *G06F 40/134* (2020.01)
  *G06F 3/04842* (2022.01)
  *G06F 40/117* (2020.01)

(52) U.S. Cl.
  CPC .......... *G06F 40/242* (2020.01); *G06F 40/134* (2020.01); *G06F 40/166* (2020.01); *G06F 40/205* (2020.01); *H04L 51/046* (2013.01); *G06F 3/04842* (2013.01); *G06F 40/117* (2020.01); *G06F 2203/04803* (2013.01)

(58) Field of Classification Search
  CPC .... G06F 40/242; G06F 40/134; G06F 40/166; G06F 40/205; G06F 3/04842; G06F 40/117
  See application file for complete search history.

(56) References Cited

U.S. PATENT DOCUMENTS

| | | | |
|---|---|---|---|
| 11,102,151 B1 * | 8/2021 | Reuss | H04L 51/52 |
| 2004/0148156 A1 * | 7/2004 | Hawkins | G06F 40/242 704/10 |
| 2004/0187084 A1 * | 9/2004 | Berstis | G06F 40/232 707/E17.005 |
| 2007/0143410 A1 * | 6/2007 | Kraft | G06Q 10/107 709/206 |
| 2008/0168141 A1 * | 7/2008 | Keohane | H04L 51/00 709/206 |

(Continued)

*Primary Examiner* — Asher D Kells
(74) *Attorney, Agent, or Firm* — ArentFox Schiff LLP

(57) ABSTRACT

The present application relates to defining acronyms in messages between a sender device and a receiver device. The sender device receives a text content of a message from a user and parses the text content to identify one or more acronyms within the message. The sender device presents, to the user, a secondary task pane including the one or more acronyms present within the message and corresponding acronym definitions in editable text fields and receives, from the user, an update to one or more of the corresponding acronym definitions. The sender device sends the message and metadata including the corresponding acronym definitions to one or more other users. A receiver device receives the message and converts each of the acronyms to a respective hyperlink. The receiver device detects a user interaction with the respective hyperlink for a respective acronym and presents at least the respective first acronym definition.

24 Claims, 7 Drawing Sheets

(56) References Cited

U.S. PATENT DOCUMENTS

| | | | |
|---|---|---|---|
| 2013/0191739 A1* | 7/2013 | Bank | G06F 40/157 |
| | | | 715/259 |
| 2013/0246047 A1* | 9/2013 | Vassilieva | G06F 40/295 |
| | | | 704/9 |
| 2014/0082104 A1* | 3/2014 | Mann | H04L 51/046 |
| | | | 709/206 |
| 2016/0105386 A1* | 4/2016 | Anders | G06F 40/157 |
| | | | 709/206 |
| 2019/0179898 A1* | 6/2019 | Jetley | G06F 9/453 |
| 2019/0179958 A1* | 6/2019 | Curzi | G06F 16/31 |
| 2020/0110753 A1* | 4/2020 | Silk | G06F 16/9535 |
| 2020/0201898 A1* | 6/2020 | Esponda | G06F 16/3344 |
| 2022/0284073 A1* | 9/2022 | Bagchi | G06F 16/958 |

\* cited by examiner

ACRONYM IDENTIFICATION AND DEFINITION IN MESSAGES

BACKGROUND

A common practice for the composers of text-based messages is to utilize acronyms and abbreviations. While the meaning of these shortened terms may be obvious to the person sending the message, the meaning may not be obvious to one or more recipients. Interpretation of a shortened term may be dependent upon context of the message and knowledge of the recipients. For example, internal company and work group communications use many acronyms, which may be efficient for insiders who share a context for understanding the acronyms. When communicating with new hires and employees from different work groups, however, overlooked acronym usage can create confusion. For instance, an acronym may have multiple definitions depending on the context. There may be no authoritative source for acronym definitions and generic resources may not include definitions for localized contexts.

In some cases, acronyms may create an accessibility issue as well. For example, acronyms or other shortened terms may pose difficulties for accessibility devices such as screen readers, which may not know whether to read the acronym as a word or spell out the acronym. Tools to identify acronyms such as internet or local searches may require changing applications, which may disrupt operation of the accessibility device. Such search techniques may also rely heavily on visual scanning of results, which may reduce accessibility. Accordingly, people who rely on such accessibility devices may be further excluded from participation in conversations if messages include difficult acronyms.

In view of the foregoing, there is a need in the art for improving user interfaces related to acronyms within messages.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to an apparatus for providing definitions of acronyms within messages, including: a memory storing computer-executable instructions; and at least one processor configured to execute the instructions to: receive a text content of a first message from a user via a user interface; parse the text content to identify one or more acronyms within the first message; present, to the user, a secondary task pane including the one or more acronyms present within the first message and corresponding acronym definitions in editable text fields; receive, from the user, an update to one or more of the corresponding acronym definitions; and send the first message and first metadata including the corresponding acronym definitions to one or more other users.

In some aspects, the techniques described herein relate to an apparatus, wherein the at least one processor is further configured to: receiving a second message including second metadata that defines a second plurality of definitions of acronyms included in the second message; convert each of the acronyms included in the second message to a respective hyperlink configured to display a respective first acronym definition of the second plurality of definitions of acronyms; detect a user interaction with the respective hyperlink for a respective acronym; and present at least the respective first acronym definition in response to the user interaction.

In some aspects, the techniques described herein relate to an apparatus, wherein the first metadata is received in a header of an internet protocol (IP) packet carrying the first message and includes a JavaScript object notation (JSON) object defining the acronyms as key-value pairs.

In some aspects, the techniques described herein relate to an apparatus, wherein at least one of the corresponding acronym definitions in editable text boxes is a suggested acronym definition from a local glossary or a global glossary.

In some aspects, the techniques described herein relate to an apparatus, wherein the at least one processor is configured to: present, in response to a user selection of a text box, one or more suggested acronym definitions from a global glossary; and receive a selection of the one or more suggested acronym definitions.

In some aspects, the techniques described herein relate to an apparatus, wherein the at least one processor is configured to apply regular expressions to the text content.

In some aspects, the techniques described herein relate to an apparatus, wherein the at least one processor is configured to add an updated corresponding acronym definition to a local glossary.

In some aspects, the techniques described herein relate to an apparatus, wherein the at least one processor is configured to: access a global glossary to retrieve a second respective acronym definition of the respective acronym; and display the second respective acronym definition along with the first respective acronym definition.

In some aspects, the techniques described herein relate to a method including: receiving a text content of a message from a user via a user interface; parsing the text content to identify one or more acronyms within the message; presenting, to the user, a secondary task pane including the one or more acronyms present within the message and corresponding acronym definitions in editable text fields; receiving, from the user, an update to one or more of the corresponding acronym definitions; and sending the message and metadata including the corresponding acronym definitions to one or more other users.

In some aspects, the techniques described herein relate to a method, wherein at least one of the corresponding acronym definitions in editable text fields is an empty text field.

In some aspects, the techniques described herein relate to a method, wherein at least one of the corresponding acronym definitions in editable text boxes is a suggested acronym definition from a local glossary or a global glossary.

In some aspects, the techniques described herein relate to a method, wherein receiving, from the user, an update to one or more of the corresponding acronym definitions includes: presenting, in response to a user selection of a text box, one or more suggested acronym definitions from a global glossary; and receiving a selection of the one or more suggested acronym definitions.

In some aspects, the techniques described herein relate to a method, wherein the one or more suggested acronym definitions are based on a usage frequency.

In some aspects, the techniques described herein relate to a method, further including identifying a context of the message, wherein the one or more suggested acronym definitions are based on the identified context.

In some aspects, the techniques described herein relate to a method, wherein parsing the message to identify one or more acronyms present in the message includes applying regular expressions to the text content.

In some aspects, the techniques described herein relate to a method, further including adding an updated corresponding acronym definition to a local glossary.

In some aspects, the techniques described herein relate to a method including: receiving a message including metadata that defines a plurality of definitions of acronyms included in the message; converting each of the acronyms included in the message to a respective hyperlink configured to display a respective first acronym definition of the plurality of definitions of acronyms; detecting a user interaction with the respective hyperlink for a respective acronym; and presenting at least the respective first acronym definition in response to the user interaction.

In some aspects, the techniques described herein relate to a method, further including: accessing a global glossary to retrieve a second respective acronym definition of the respective acronym; and displaying the second respective acronym definition along with the first respective acronym definition.

In some aspects, the techniques described herein relate to a method, wherein displaying the second respective acronym definition includes indicating that the second respective acronym definition is a same definition as the first respective acronym definition.

In some aspects, the techniques described herein relate to a method, wherein the second respective acronym definition is based on a usage frequency of the second respective acronym definition.

In some aspects, the techniques described herein relate to a method, further including identifying a context of the message, wherein the second respective acronym definition is based on the identified context.

In some aspects, the techniques described herein relate to a method, further including adding the first respective acronym definition to a local glossary or global glossary.

In some aspects, the techniques described herein relate to a method, wherein the metadata includes sender-defined definitions of the acronyms included in the message.

In some aspects, the techniques described herein relate to a method, wherein the hyperlink includes tags compatible with a screen reader.

In some aspects, the techniques described herein relate to a method, further including reading the message with a screen reader, wherein the tags indicate reading the definition in response to a user selection. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
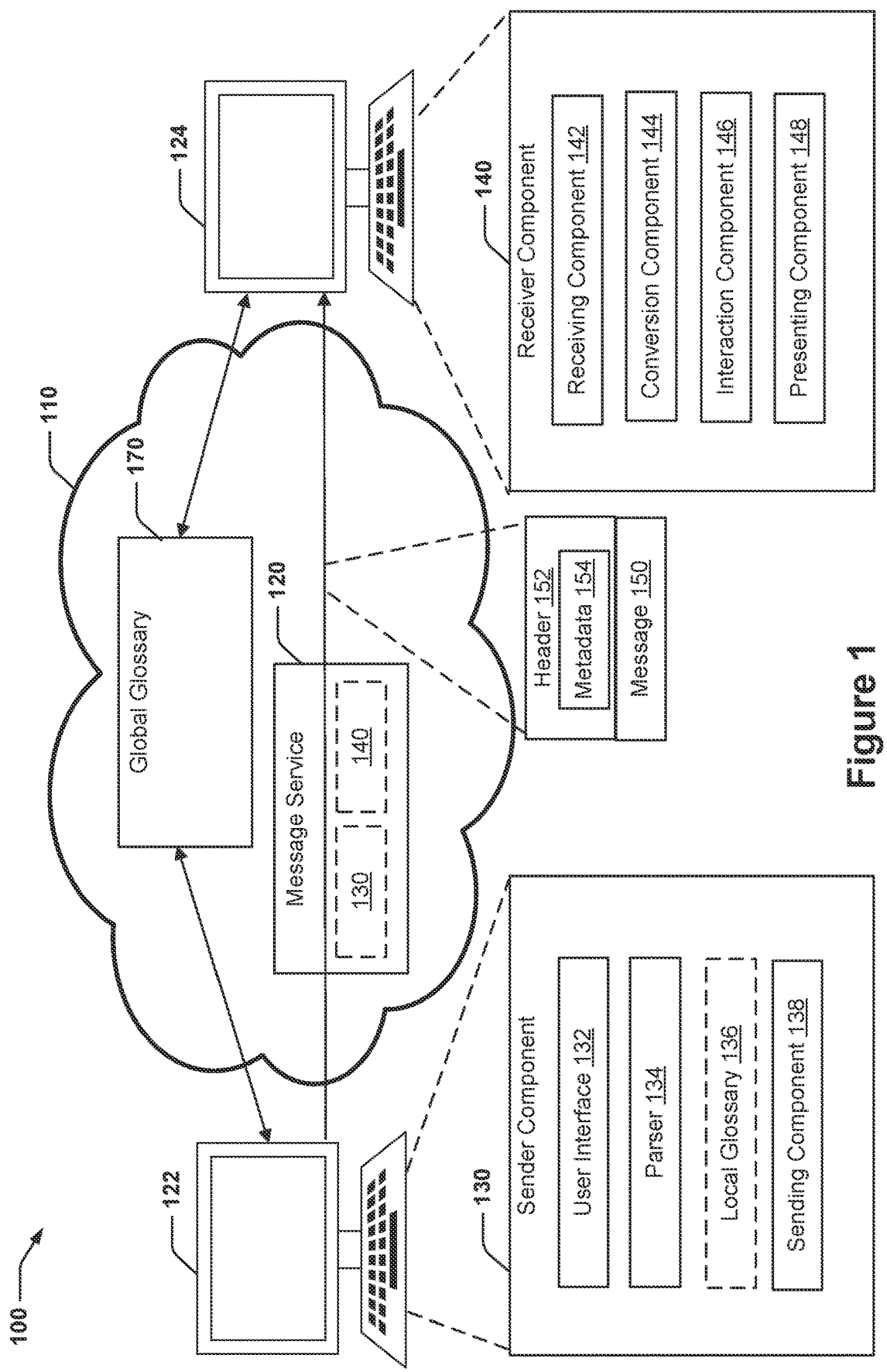
FIG. 1 is a conceptual diagram of an example of an architecture for a messaging application.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to acronym identification and definition in messages. The disclosure provides aspects of a messaging application and messaging devices at the sender side and the receiver side to define acronyms according to a context of the sender. In an aspect, the application at the sender side identifies one or more acronyms within a text of the message, for example, as the message is being composed or prior to sending the message. A user interface at the sender side presents the sender with a secondary task pane that includes the one or more acronyms within the message and corresponding acronym definitions in editable text boxes. The corresponding acronym definitions may be populated by the application based on a local glossary or a global glossary. The user interface may allow the sender to edit the corresponding acronym definitions. When the sender sends the message, the application generates metadata for the message that includes the corresponding acronym definitions.

At the receiver side, the application receives the message and the metadata including the acronym definitions. The application converts one or more acronyms in the message to a hyperlink configured to display a first acronym definition. For example, the hyperlink may include hypertext markup language (HTML) tags for displaying the first acronym definition in response to a user interaction such as a mouse over or a click. The application may detect a user interaction with the hyperlink and present at least the first acronym definition in response to the user interaction.

In an aspect, the message application with acronym definition improves the functioning of a user interface. By providing a convenient mechanism for a sender to provide context in the form of acronym definitions, the application makes use of the messaging application more convenient compared to conventional techniques such as parenthetical definitions of acronyms. In some implementations, where a local dictionary is used to suggest definitions, the convenience of the sender is further improved by automatically providing contextual definitions. For the receiver, the application improves the user interaction by providing additional information without negatively affecting the readability of the message. That is, recipients that have the necessary context can read the acronyms without clutter and recipients that do not have the context can easily find the definition. Further, in implementations where the hyperlink is compatible with an accessibility device, the user interface improves accessibility of the application.

Figure 4:
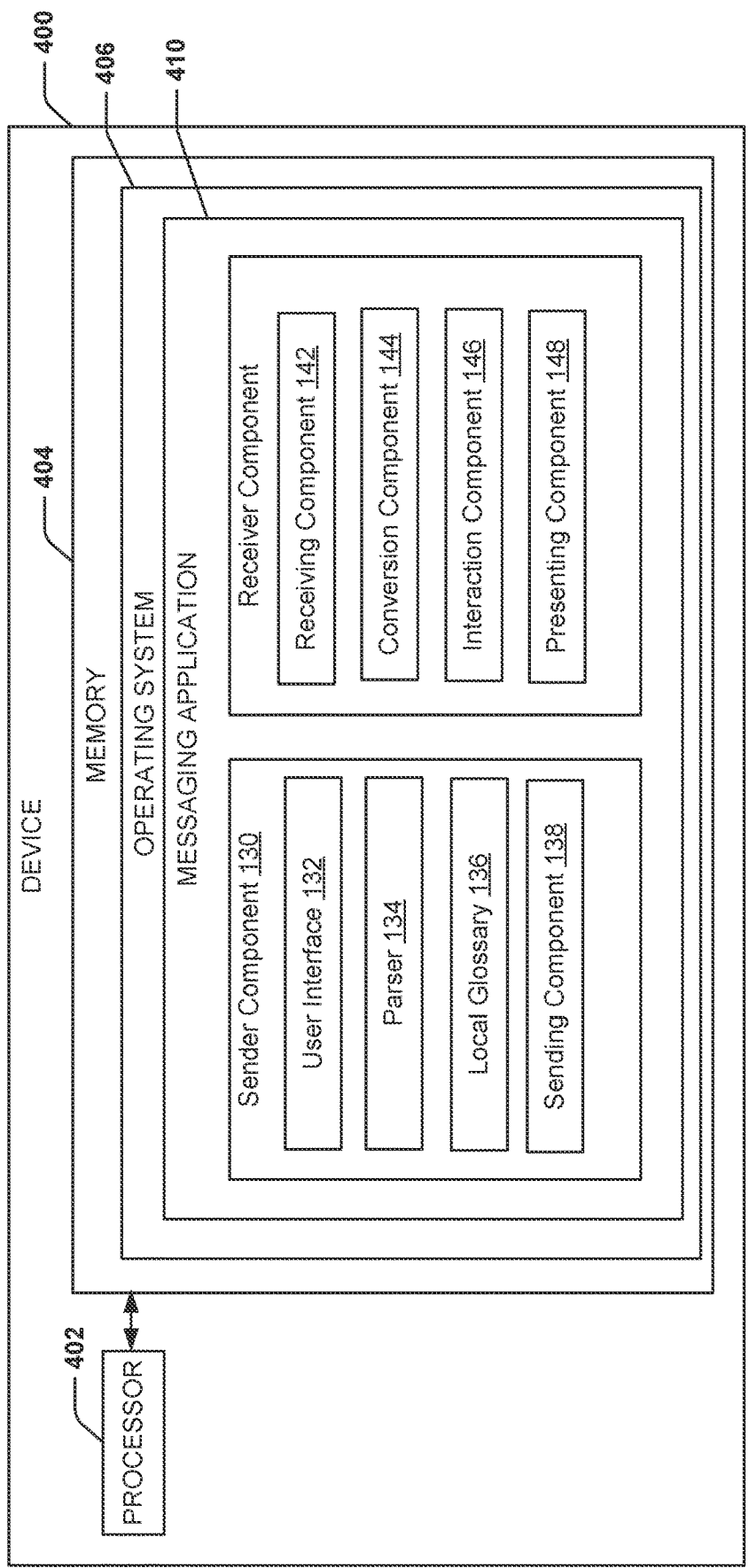
FIG. 4 is a schematic diagram of an example of an apparatus of a user device for a messaging service.
Figure 5:
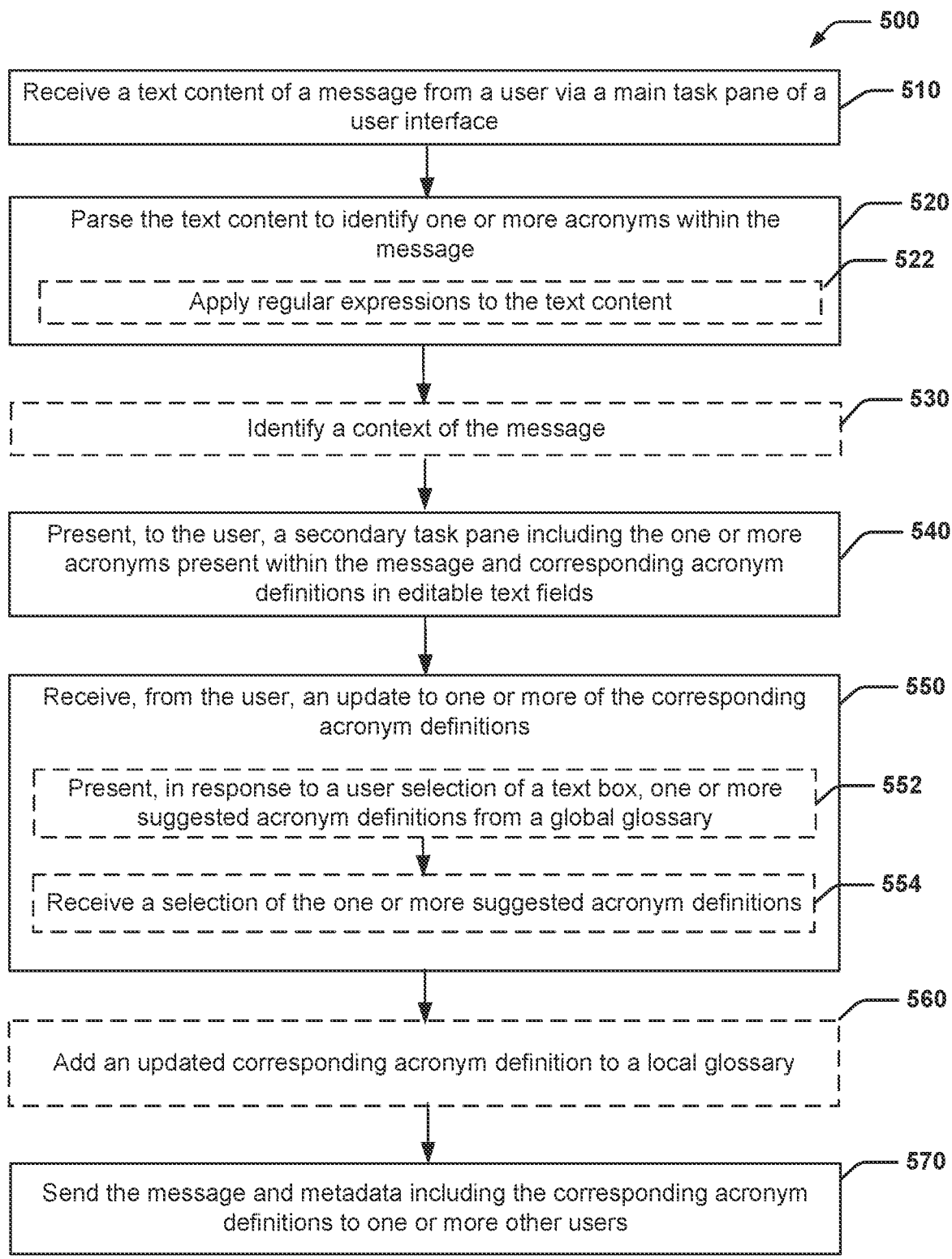
FIG. 5 is a flow diagram of an example of a method for providing acronym definitions for a message.
Figure 6:
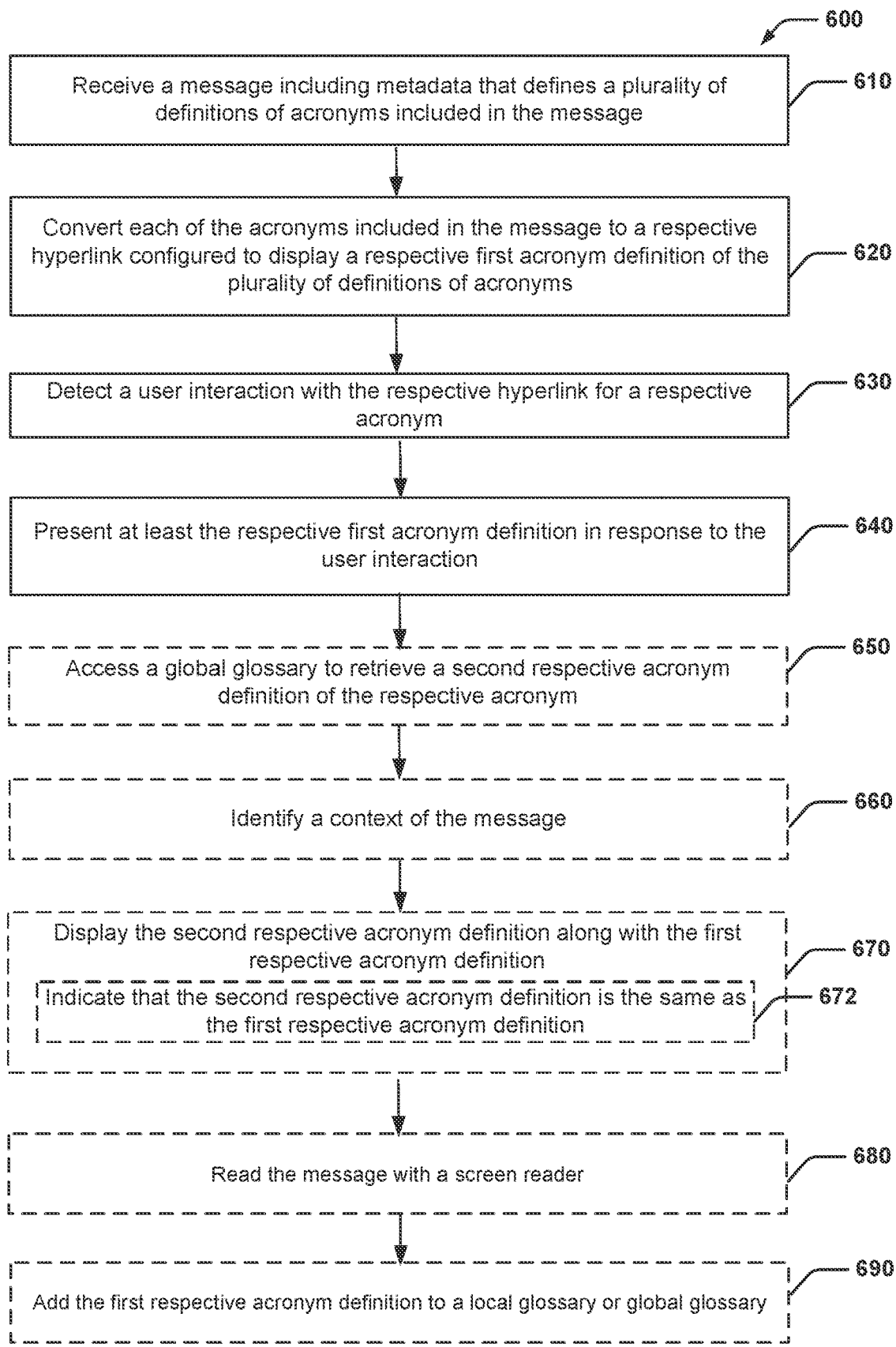
FIG. 6 is a flow diagram of an example of a method for presenting acronym definitions within a message.

Turning now to FIGS. 1-7, examples are depicted with reference to one or more components and one or more methods that may perform the actions or operations described herein, where components and/or actions/operations in dashed line may be optional. Although the operations described below in FIG. 6 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a conceptual diagram 100 of an example of an architecture for a messaging application. The messaging application may be hosted on a network 110 as a message service 120. For example, the message service 120 may be a web application hosted on one or more multiple devices such as servers or virtualized cloud resources. Application clients may be executed on a sender device 122 and a receiver device 124. In an aspect, the sender device 122 includes a sender component 130 configured to define acronyms used in a message 150. In an aspect, the receiver device 124 includes a receiver component 140 configured to present the message 150 with acronyms as hyperlinks to definitions of the acronyms. In some implementations, the message service 120 may perform some actions on behalf of the sender device 122 or receiver device 124. For example, the message service 120 may include a sender component 130 or receiver component 140 that may be accessed via a web browser. The sender device 122 and the receiver device 124 may be referred to as user devices. Examples of user devices include a cellular phone, a smart phone, a session initiation protocol (SIP) phone, a laptop, a personal digital assistant (PDA), a multimedia device, a video device, a digital audio player (such as a MP3 player), a camera, a game console, a tablet, a smart device, a wearable device, a vehicle, a display, or any other similar functioning device. In some implementations, a user device may be both a sender device 122 and a receiver device 124. The network 110 may be, for example, a wide area network (WAN). In some implementations, the network 110 may be connected to other networks such as an access network to provide services to devices 122, 124 and form an Internet.

The message service 120 may be any service for communicating messages from a sender device 122 to a receiver device 124. For example, the message service 120 may be an email service, an instant messaging application, a group messaging application, a chat room, or a message board. The message service 120 may receive a message 150 from a sender device 122 and route the message 150 to the receiver device 124. The format of the message 150 may vary based on the message service 120. In some implementations, the message 150 may include one or more internet protocol (IP) packets. The metadata 154 may be included in an IP header of an IP packets. For instance, the metadata may be a JavaScript Object Notation (JSON) object defining key-value pairs. A JSON object may be similarly added to other message formats.

The sender component 130 may include code executable on the sender device 122 and/or the message service 120 to define acronyms used in a message 150. For example, in some implementations, the sender component 130 may be a component or add-in to a messaging application. In other implementations, the sender component 130 may be a component of the message service 120 that provides a user interface via a client application or web browser. The sender component 130 includes a user interface 132 configured to receive a text content of a message from a user. The sender component 130 includes a parser 134 configured to parse the text content to identify one or more acronyms within the message. For example, the parser 134 may be defined by regular expressions for searching for acronyms. In some implementations, the parser 134 may also identify other short forms such as abbreviations or foreign terms (e.g., Latin) used as abbreviations. The parser 134 may optionally be configured to omit a set of informal or well-known acronyms. The user interface 132 is further configured to present, to the user, a secondary task pane including the one or more acronyms present within the message and corresponding acronym definitions in editable text fields. In some implementations, the sender component 130 optionally includes a local glossary 136 that includes acronym definitions for the user that are used to populate the corresponding acronym definitions. The user interface 132 is further configured to receive, from the user, an update to one or more of the corresponding acronym definitions. The sender component 130 includes a sending component 138 configured to send the message 150 and metadata 154 including the corresponding acronym definitions to one or more other users (e.g., via the message service 120).

The receiver component 140 may include code executable on the receiver device 124 and/or the message service 120 to present the message 150 with acronyms as hyperlinks to definitions of the acronyms. The receiver component 140 includes a receiving component 142 configured to receive a message including metadata that defines a plurality of definitions of acronyms included in the message. The receiver component 140 includes a conversion component 144 configured to convert, one or more acronyms in the message to a hyperlink configured to display a first acronym definition of the plurality of acronym definitions. The receiver component 140 includes an interaction component 146 configured to detect a user interaction with the hyperlink. The receiver component 140 includes a presenting component 148 configured to present at least the first acronym definition in response to the user interaction.

In some implementations, the network 110 may include a global glossary 170. The global glossary 170 may store acronym definitions. The global glossary 170 may be accessed by either the sender component 130 or the receiver component 140. For example, the sender component 130 may request a definition of an acronym when the local glossary 136 does not include a definition for the acronym. In some implementations, the receiver component 140 may provide a second definition based on the global glossary 170. The global glossary 170 may track usage of acronym definitions, for example, based on metadata 154, which may be collected via the message service 120. The global glossary 170 may provide definitions based on a usage frequency. For example, the global glossary 170 may provide a most commonly used definition or may sort suggested definitions in order of usage frequency. In some implementations, the suggested definitions may also be based on a context of the message.

Figure 2:
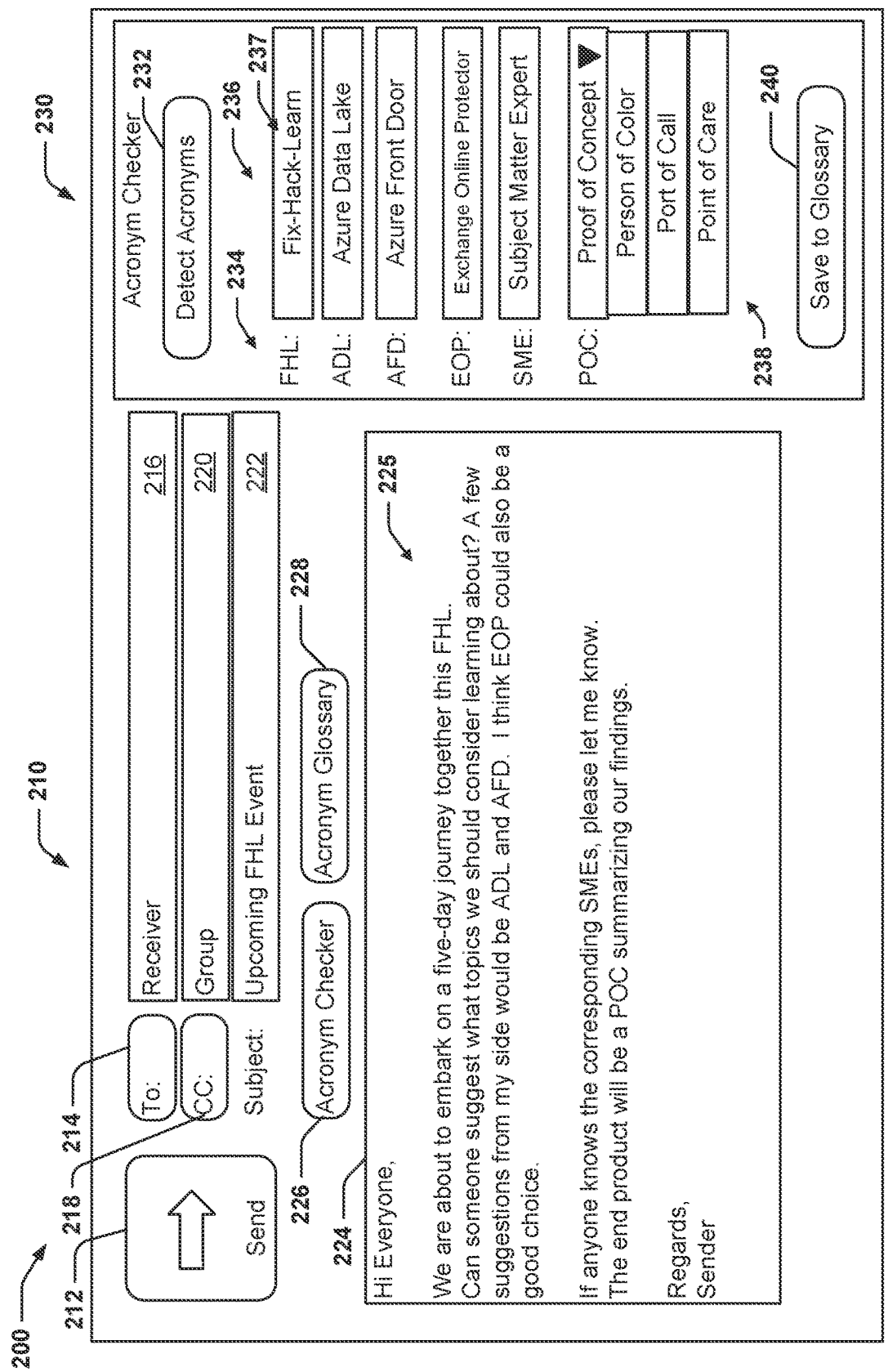
FIG. 2 is a diagram of an example user interface for detecting and defining acronyms.

FIG. 2 is a diagram of an example user interface 200 for detecting and defining acronyms. The user interface 200 may correspond to the user interface 132 of the sender component 130. As illustrated, the user interface 200 may be for an email application, but the concepts described herein are applicable to other messaging services. The user interface 200 may include, for example, a main task pane 210 and a secondary task pane 230. The main task pane 210 may include controls for composing and sending a message such as a send button 212, To button 214, recipient list 216, carbon copy (CC) button 218, CC list 220, subject line 222, and body text field 224. The body text field 224 may display text content 225 entered by a user. The main task pane 210 may include additional controls (not shown) for specifying formatting as known in the art. In an aspect, the main task pane 210 may include an acronym checker button 226 configured to open the secondary task pane 230. In some implementations, the main task pane 210 includes an acronym glossary button 228 that opens a secondary task pane for editing an acronym glossary (e.g., local glossary 136). The acronym glossary button 228 or functionality thereof may be available via other interfaces such as a toolbar, menu, or hotkey.

The secondary task pane 230 includes controls for defining acronyms. For example, the secondary task pane 230 may include a detect acronyms button 232 configured to start execution of the parser 134 on the text content 225 in the body text field 224. In some implementations, the parser 134 may run in the background and parse the text content 225 in the body text field 224 to identify acronyms. Selecting an identified acronym may open the secondary task pane 230. The secondary task pane 230 may be, for example, a side task pane, a top task pane, a bottom task pane, or a pop-up window. The parser 134 may populate acronyms 234. For example, the body text field 224 may include the acronyms: FHL, ADL, AFD, EOP, SME, and POC. Each acronym 234 may be associated with a text field 236 including the corresponding definition 237 of the acronym 234. In some implementations, the local glossary 136 may populate the text fields 236 with suggested definitions based on local definitions. When the local glossary 136 does not include a local definition, the local glossary 136 may query the global glossary 170. In some implementations, the local glossary 136 and/or global glossary 170 may provide multiple suggested definitions 238. A user may select one of the suggested definitions 238 for inclusion in the text field 236. In some implementations, neither the local glossary 136 nor the global glossary 170 may include a definition for an acronym, in which case the corresponding text field 236 may be an empty text field. The user may also edit any of the text fields 236. The secondary task pane 230 may include a button 240 for saving the definitions 237 in the text fields 236 to the local glossary 136 as local definitions.

In an aspect, selection of the send button 212 may trigger the sending component 138 to generate the metadata 154. The sending component 138 may also generate the header 152 and generate the message 150 based on the body text field 224. The sending component 138 may send the message 150, header 152, and metadata 154 to the message service 120 in response to selection of the send button 212. In some implementations, selection of the send button 212 may prompt the user to open the secondary task pane 230, for example, if one or more acronyms 234 are not associated with a definition in the corresponding text field 236.

Figure 3:
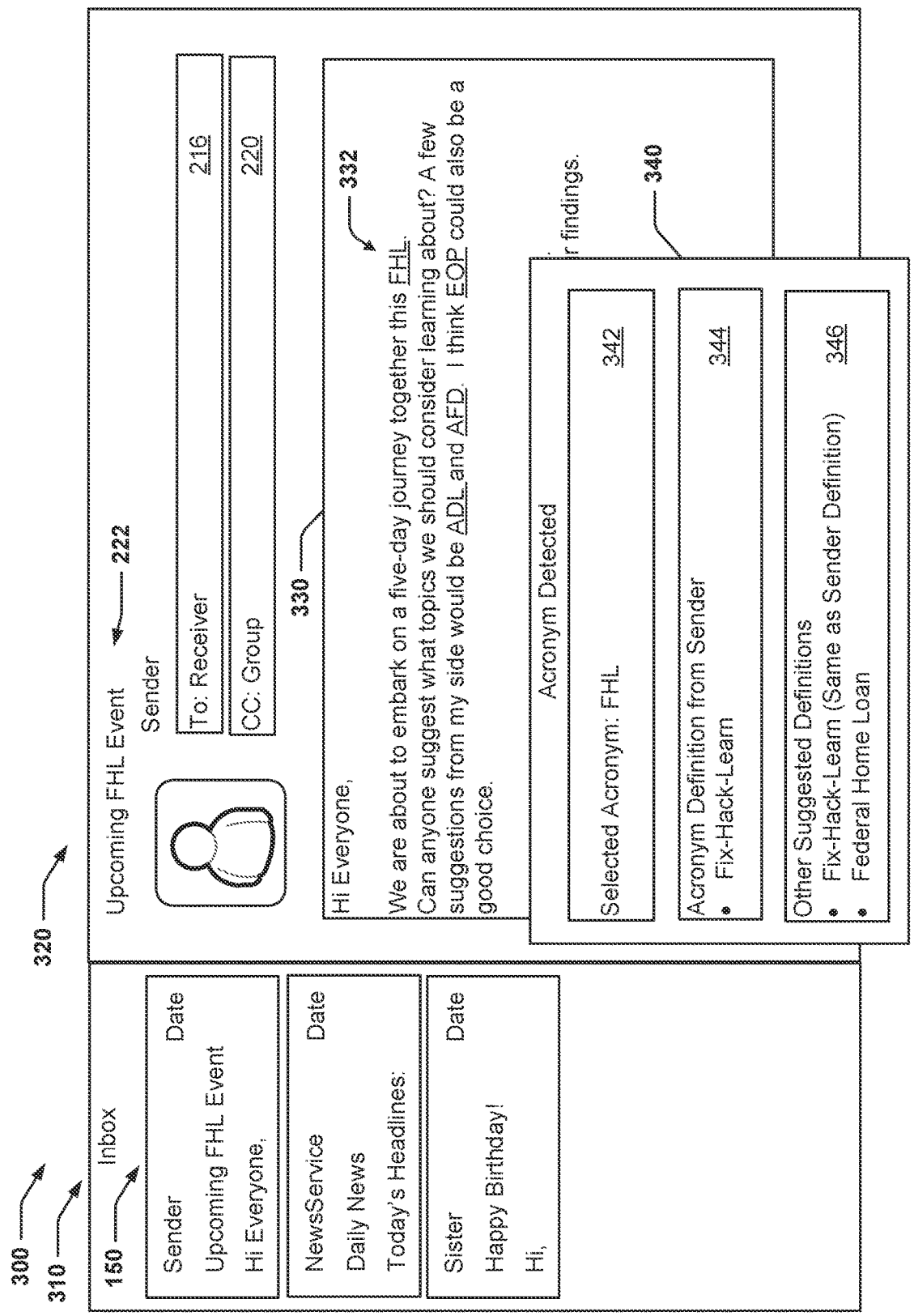
FIG. 3 is a diagram of an example user interface for presenting acronym definitions within a message.

FIG. 3 is a diagram of an example user interface 300 for presenting acronym definitions within a message. The user interface 300 may correspond to the presenting component 148 of the receiver component 140. As illustrated, the user interface 300 may be for an email application, but the concepts described herein are applicable to other messaging services. The user interface 300 may include, for example, a message browser 310 (e.g., Inbox) and a message viewing pane 320. The message browser 310 may allow a user to select a message 150 to view in the message viewing pane 320. The message viewing pane 320 may include message information such as a subject line 222, sender icon or picture and name, recipient list 216, CC list 220, and a message text field 330.

In an aspect, the message text field 330 may include the message 150 that has been modified to identify acronyms. In particular, acronyms identified in the metadata 154 are converted to hyperlinks configured to display one or more definitions of the acronym. For example, the acronym "FHL," which was plain text in the message 150, may be converted to a hyperlink 332 that is configured to display definitions of the acronym in a preview pane 340. In an aspect, the preview pane 340 may be presented in response to a user interaction with the hyperlink 332. In some implementations, the preview pane may be visible only during the user interaction (e.g., a mouse over) or may persist (e.g., in response to a click). The preview pane 340 may be configured to clearly present the definitions visually. In some implementations, the preview pane 340 may utilize HTML tags that allow the preview pane 340 to be correctly read by an accessibility device such as a screen reader. For instance, semantic HTML tags may help a screen reader identify elements within the preview pane 340 and allow keyboard-only navigation. In the illustrated example, the preview pane 340 may identify the selected acronym 342 and the acronym definition 344 from the sender. In some implementations, the preview pane 340 may identify other suggested definitions 346, for example, from the global glossary 170 or a local glossary 136 at the receiver device 124.

FIG. 4 is a schematic diagram of an example of an apparatus 400 of a user device for a messaging service. The apparatus 400 may be implemented as one or more computing devices in the network 110. For example, the apparatus 400 may be a sender device 122 and/or a receiver device 124.

In an example, apparatus 400 can include a processor 402 and/or memory 404 configured to execute or store instructions or other parameters related to providing an operating system 406, which can execute one or more applications or processes, such as, but not limited to, a messaging application 410, which may include one or both of the sender component 130 and the receiver component 140. For example, processor 402 and memory 404 may be separate components communicatively coupled by a bus (e.g., on a motherboard or other portion of a computing device, on an integrated circuit, such as a system on a chip (SoC), etc.), components integrated within one another (e.g., processor 402 can include the memory 404 as an on-board component), and/or the like. Memory 404 may store instructions, parameters, data structures, etc. for use/execution by processor 402 to perform functions described herein.

In an example, the sender component 130 may include the user interface 132, the parser 134, the local glossary 136, and the sending component 138. The receiver component 140 may include the receiving component 142, the conversion component 144, the interaction component 146, and the presenting component 148.

The user interface 132 may include computer-executable code for communicating with or controlling user interface devices such as a keyboard, mouse, microphone, speaker, display, etc. The user interface 132 may be configured to generate the user interface 200 on a display of the sender device 122. The user interface 132 may receive inputs from a user via a keyboard, mouse, or microphone, for example.

The parser 134 may include computer-executable code for identifying acronyms in text content. For example, the parser 134 may be a function or application that receives text as input and outputs a subset of the text that the parser 134 has identified as acronyms. In some implementations, the parser 134 may be configured with regular expressions that identify acronyms. For example, an acronym may include only capital letters with length greater than or equal to two and may be identified by the regular expression [A-Z]{2,}. Other regular expressions may be used depending on the regular expression engine. In some implementations, a dictionary may be used to exclude The local glossary 136 may include computer-executable code defining a data structure and access to the data structure. For example, the local glossary 136 may allow multiple definitions to be associated with an acronym.

The sending component 138 may include communications hardware and computer-executable code for controlling the communications hardware. For example, the sending component 138 may include a network interface and protocol stack for transmitting IP packets over the network interface. The sending component 138 may also include code for adding metadata (e.g., a JSON object) defining the acronyms in a message to a packet header.

The receiving component 142 may include communications hardware and computer-executable code for controlling the communications hardware. For example, the receiving component 142 may include a network interface and protocol stack for receiving IP packets over the network interface. The receiving component 142 may be configured to extract the metadata from the header of an IP packet.

The conversion component 144 may include computer-executable code for converting a text acronym to a hyperlink. For example, the conversion component 144 may define a template for a preview pane 340 and populate the template based on metadata content and/or information received from a global glossary 170.

The interaction component 146 may include computer-executable code to detect a user interaction with a hyperlink. For example, the interaction component 146 may be a user interface of a messaging application or a web-browser that detects input from a mouse or keyboard.

The presenting component 148 may include computer-executable code for presenting an acronym definition in response to the user interaction. For example, the presenting component 148 may be a user interface of a messaging application or web-browser that outputs an image to a display, for example, based on HTML associated with the hyperlink.

FIG. 5 is a flow diagram of an example of a method 500 for providing acronym definitions for a message. For example, the method 500 can be performed by the sender device 122, the apparatus 400, and/or one or more components thereof to send the message 150 with metadata 154 defining the acronyms in the message 150.

At block 510, the method 500 includes receiving a text content of a message from a user via a user interface. In an example, the sender component 130 and/or the user interface 132, e.g., in conjunction with processor 402, memory 404, and operating system 406, can receive the text content 225 of the message 150 from a user via a user interface 200. For example, the user may enter the text content 225 in the body text field 224 using a physical or virtual keyboard or a speech input.

At block 520, the method 500 includes parsing the text content to identify one or more acronyms within the message. In an example, the sender component 130 and/or the parser 134, e.g., in conjunction with processor 402, memory 404, and operating system 406, can parse the text content 225 to identify one or more acronyms 234 within the message. In some implementations, at sub-block 522, the block 520 may optionally including applying regular expressions to the text content 225.

At block 530, the method 500 may optionally include identifying a context of the message. In an example, the sender component 130, e.g., in conjunction with processor 402, memory 404, and operating system 406, can identify a context of the message. For example, the context may be based on the recipients or key words in the subject line or text content.

At block 540, the method 500 includes presenting, to the user, a secondary task pane including the one or more acronyms present within the message and corresponding acronym definitions in editable text fields. In an example, the sender component 130 and/or the user interface 132, e.g., in conjunction with processor 402, memory 404, and operating system 406, can present, to the user, a secondary task pane 230 including the one or more acronyms 234 present within the message and corresponding acronym definitions in editable text fields 236. The corresponding definitions may be suggested definitions from the local glossary 136 and/or the global glossary 170. In some implementations, the one or more suggested acronym definitions are based on a usage frequency. In some implementations, the one or more suggested acronym definitions are based on the identified context (e.g., in block 530).

At block 550, the method 500 includes receiving, from the user, an update to one or more of the corresponding acronym definitions. In an example, the sender component 130 and/or the user interface 132, e.g., in conjunction with processor 402, memory 404, and operating system 406, can receive, from the user, an update to one or more of the corresponding acronym definitions. For example, the user may edit the text field 236. In some implementations, at sub-block 552, the block 550 may optionally include presenting, in response to a user selection of a text field 236, one or more suggested acronym definitions 238 from a global glossary 170. At sub-block 554, the block 550 may optionally include receiving a selection of the one or more suggested acronym definitions 238.

At block 560, the method 500 may optionally include adding an updated corresponding acronym definition to a local glossary. In an example, the sender component 130 and/or local glossary 136, e.g., in conjunction with processor 402, memory 404, and operating system 406, can add an updated corresponding acronym definition 237 to the local glossary 136.

At block 570, the method 500 includes sending the message and metadata including the corresponding acronym definitions to one or more other users. In an example, the sender component 130 and/or the sending component 138, e.g., in conjunction with processor 402, memory 404, and operating system 406, can send the message 150 and metadata 154 including the corresponding acronym definitions to one or more other users (e.g., at receiver device 124).

FIG. 6 is a flow diagram of an example of a method 600 for presenting acronym definitions within a message. For example, the method 600 can be performed by the receiver device 124, the apparatus 400, and/or one or more components thereof to present the message 150 with hyperlinks 332 defining the acronyms in the message 150.

At block 610, the method 600 includes receiving a message including metadata that defines a plurality of definitions of acronyms included in the message. In an example, the receiver component 140 and/or the receiving component 142, e.g., in conjunction with processor 402, memory 404, and operating system 406, can receive the message 150 including metadata 154 that defines a plurality of definitions 237 of acronyms 234 included in the message.

At block 620, the method 600 includes converting each of the acronyms included in the message to a respective hyperlink configured to display a respective first acronym definition of the plurality of definitions of acronyms. In an example, the receiver component 140 and/or the conversion component 144, e.g., in conjunction with processor 402, memory 404, and operating system 406, can convert each of the acronyms 234 included in the message 150 to a respective hyperlink 332 configured to display a respective first acronym definition of the plurality of definitions of acronyms.

At block 630, the method 600 includes detecting a user interaction with the respective hyperlink for a respective acronym. In an example, the receiver component 140 and/or the interaction component 146, e.g., in conjunction with processor 402, memory 404, and operating system 406, can detect a user interaction with the respective hyperlink 332 for a respective acronym 342.

At block 640, the method 600 includes presenting at least the respective first acronym definition in response to the user interaction. In an example, the receiver component 140 and/or the presenting component 148, e.g., in conjunction with processor 402, memory 404, and operating system 406, can present at least the respective first acronym definition 344 in response to the user interaction.

At block 650, the method 600 may optionally include accessing a global glossary to retrieve a second respective acronym definition of the respective acronym. In an example, the receiver component 140 and/or the presenting component 148, e.g., in conjunction with processor 402, memory 404, and operating system 406, can access the global glossary 170 to retrieve a second respective acronym definition 346 of the respective acronym.

At block 660, the method 600 may optionally include identifying a context of the message. In an example, the receiver component 140 and/or the presenting component 148, e.g., in conjunction with processor 402, memory 404, and operating system 406, can identify a context of the message.

At block 670, the method 600 may optionally include displaying the second respective acronym definition along with the first respective acronym definition. In an example, the receiver component 140 and/or the presenting component 148, e.g., in conjunction with processor 402, memory 404, and operating system 406, can display the second respective acronym definition 346 along with the first respective acronym definition 344. In some implementations, at sub-block 672, the block 670 may optionally include indicating that the second respective acronym definition 346 is the same as the first respective acronym definition 344. In some implementations, e.g., where the global glossary 170 includes multiple definitions, the second respective acronym definition is based on a usage frequency of the second respective acronym definition. In some implementations, where block 660 is performed, the second respective acronym definition is based on the identified context.

At block 680, the method 600 may optionally include reading the message with a screen reader. In an example, the receiver component 140 and/or the presenting component 148, e.g., in conjunction with processor 402, memory 404, and operating system 406, can read the message 150 with a screen reader.

At block 690, the method 600 may optionally include adding the first respective acronym definition to a local glossary. In an example, the receiver component 140 and/or the presenting component 148, e.g., in conjunction with processor 402, memory 404, and operating system 406, can add the first respective acronym definition 344 to the local glossary 136. The first respective acronym definition 344 may then be suggested when composing messages.

Figure 7:
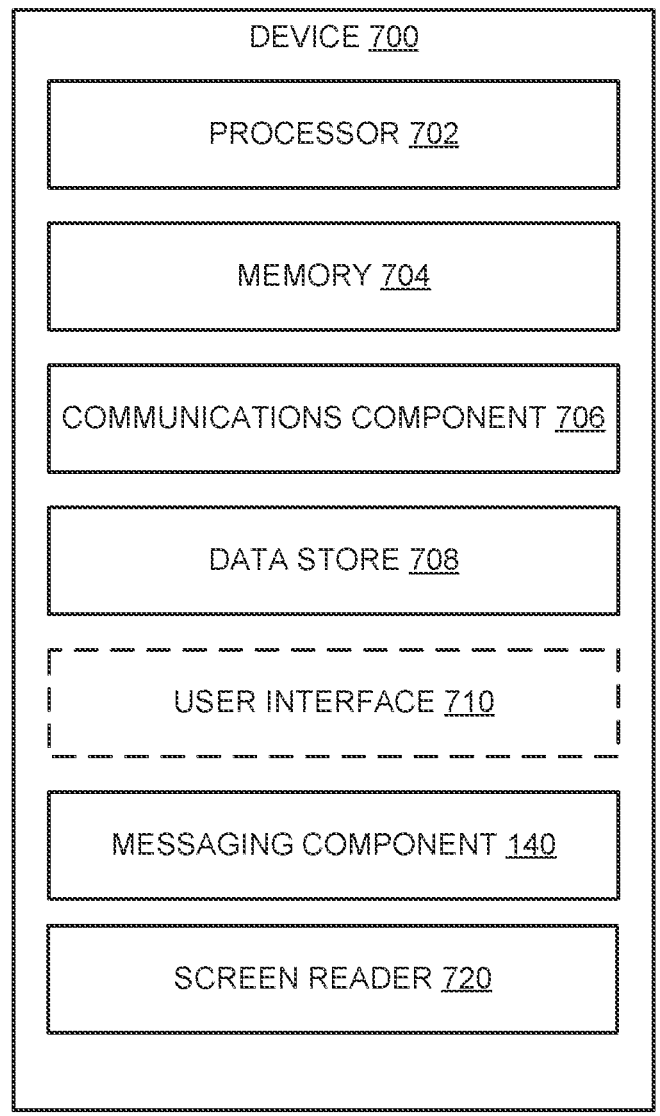
FIG. 7 illustrates an example of a device including additional optional component details as those shown in FIG. 4.

FIG. 7 illustrates an example of a device 700 including additional optional component details as those shown in FIG. 4. In one aspect, device 700 may include processor 702, which may be similar to processor 402 for carrying out processing functions associated with one or more of components and functions described herein. Processor 702 can include a single or multiple set of processors or multi-core processors. Moreover, processor 702 can be implemented as an integrated processing system and/or a distributed processing system.

Device 700 may further include memory 704, which may be similar to memory 404 such as for storing local versions of operating systems (or components thereof) and/or applications being executed by processor 702, such as the messaging application 410, the sender component 130, the receiver component 140, etc. Memory 704 can include a type of memory usable by a computer, such as random access memory (RAM), read only memory (ROM), tapes, magnetic discs, optical discs, volatile memory, non-volatile memory, and any combination thereof Further, device 700 may include a communications component 706 that provides for establishing and maintaining communications with one or more other devices, parties, entities, etc. utilizing hardware, software, and services as described herein. Communications component 706 may carry communications between components on device 700, as well as between device 700 and external devices, such as devices located across a communications network and/or devices serially or locally connected to device 700. For example, communications component 706 may include one or more buses, and may further include transmit chain components and receive chain components associated with a wireless or wired transmitter and receiver, respectively, operable for interfacing with external devices.

Additionally, device 700 may include a data store 708, which can be any suitable combination of hardware and/or software, that provides for mass storage of information, databases, and programs employed in connection with aspects described herein. For example, data store 708 may be or may include a data repository for operating systems (or components thereof), applications, related parameters, etc. not currently being executed by processor 702. In addition, data store 708 may be a data repository for the messaging application 410.

Device 700 may optionally include a user interface component 710 operable to receive inputs from a user of device 700 (e.g., an end-user) and further operable to generate outputs for presentation to the user. User interface component 710 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Device 700 may additionally include the messaging application 410 for defining acronyms within messages. The messaging application 410 may include the sender component 130, the receiver component 140, etc.

Device 700 may additionally include a screen reader 720 that is configured to read contents of the user interface 300. The screen reader 720 may be considered an accessibility device. The screen reader 720 may use tags associated with the hyperlink 332 to determine whether to read portions of the content.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for providing definitions of acronyms within messages, comprising:
   a memory storing computer-executable instructions; and
   at least one processor configured to execute the instructions to:
      receive a text content of a first message from a user via a user interface;
      parse the text content to identify one or more acronyms within the first message;
      present, to the user, a secondary task pane including the one or more acronyms present within the first message and corresponding acronym definitions in editable text fields;
      receive, from the user, an update to one or more of the corresponding acronym definitions; and
      send the first message and first metadata including the corresponding acronym definitions to one or more other users, wherein the first metadata is sent in a header of an internet protocol (IP) packet carrying the first message and includes a JavaScript object notation (JSON) object defining the acronyms as key-value pairs.

2. The apparatus of claim 1, wherein the at least one processor is further configured to:
   receive a second message including second metadata that defines a second plurality of definitions of acronyms included in the second message;
   convert each of the acronyms included in the second message to a respective hyperlink configured to display a first respective acronym definition of the second plurality of definitions of acronyms;
   detect a user interaction with the respective hyperlink for a respective acronym; and
   present at least the first respective acronym definition in response to the user interaction.

3. The apparatus of claim 2, wherein the at least one processor is configured to:
   access a global glossary to retrieve a second respective acronym definition of the respective acronym; and
   display the second respective acronym definition along with the first respective acronym definition.

4. The apparatus of claim 1, wherein at least one of the corresponding acronym definitions in editable text fields is a suggested acronym definition from a local glossary or a global glossary.

5. The apparatus of claim 1, wherein the at least one processor is configured to:
   present, in response to a user selection of a text field, one or more suggested acronym definitions from a global glossary or a local glossary; and
   receive a selection of the one or more suggested acronym definitions.

6. The apparatus of claim 1, wherein the at least one processor is configured to apply regular expressions to the text content.

7. The apparatus of claim 1, wherein the at least one processor is configured to add an updated corresponding acronym definition to a local glossary.

8. A method comprising:
- receiving a text content of a first message from a user via a user interface;
- parsing the text content to identify one or more acronyms within the first message;
- presenting, to the user, a secondary task pane including the one or more acronyms present within the first message and corresponding acronym definitions in editable text fields;
- receiving, from the user, an update to one or more of the corresponding acronym definitions; and
- sending the first message and first metadata including the corresponding acronym definitions to one or more other users, wherein the first metadata is sent in a header of an internet protocol (IP) packet carrying the first message and includes a JavaScript object notation (JSON) object defining the one or more acronyms as key-value pairs.

9. The method of claim 8, wherein at least one of the corresponding acronym definitions in editable text fields is an empty text field.

10. The method of claim 8, wherein at least one of the corresponding acronym definitions in editable text boxes is a suggested acronym definition from a local glossary or a global glossary.

11. The method of claim 8, wherein receiving, from the user, an update to one or more of the corresponding acronym definitions comprises:
- presenting, in response to a user selection of a text box, one or more suggested acronym definitions from a global glossary or a local glossary; and
- receiving a selection of the one or more suggested acronym definitions.

12. The method of claim 11, wherein the one or more suggested acronym definitions are based on a usage frequency.

13. The method of claim 11, further comprising identifying a context of the first message, wherein the one or more suggested acronym definitions are based on the identified context.

14. The method of claim 11, further comprising adding an updated corresponding acronym definition to a local glossary or a global glossary.

15. The method of claim 8, wherein parsing the first message to identify one or more acronyms present in the first message comprises applying regular expressions to the text content.

16. The method of claim 8, further comprising:
- receiving a second message including second metadata that defines definitions of a plurality of acronyms included in the second message;
- converting each of the plurality of acronyms included in the second message to a respective hyperlink configured to display a first respective acronym definition of the definitions;
- detecting a user interaction with the respective hyperlink for a respective acronym; and
- presenting at least the first respective acronym definition in response to the user interaction.

17. The method of claim 16, further comprising:
- accessing a global glossary to retrieve a second respective acronym definition of the respective acronym; and
- displaying the second respective acronym definition along with the first respective acronym definition.

18. The method of claim 17, wherein displaying the second respective acronym definition comprises indicating that the second respective acronym definition is a same definition as the first respective acronym definition.

19. The method of claim 17, wherein the second respective acronym definition is based on a usage frequency of the second respective acronym definition.

20. The method of claim 17, further comprising identifying a context of the second message, wherein the second respective acronym definition is based on the identified context.

21. The method of claim 16, further comprising adding the first respective acronym definition to a local glossary.

22. The method of claim 16, wherein the second metadata includes sender-defined definitions of the one or more acronyms included in the second message.

23. The method of claim 16, wherein the respective hyperlink includes tags compatible with a screen reader.

24. The method of claim 23, further comprising reading the second message with a screen reader, wherein the tags indicate reading the first respective acronym definition in response to a user selection.

* * * * *